United States Patent
Huang

(10) Patent No.: US 12,321,540 B1
(45) Date of Patent: Jun. 3, 2025

(54) LIGHT-EMITTING MODULE FOR TOUCHPAD

(71) Applicant: Chicony Power Technology Co., Ltd., New Taipei (TW)

(72) Inventor: Chun-Ming Huang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 18/433,796

(22) Filed: Feb. 6, 2024

(30) Foreign Application Priority Data

Nov. 17, 2023 (TW) .................. 112144651

(51) Int. Cl.
*G06F 3/0354* (2013.01)
*F21V 8/00* (2006.01)

(52) U.S. Cl.
CPC ....... *G06F 3/03547* (2013.01); *G02B 6/0068* (2013.01)

(58) Field of Classification Search
CPC .. G06F 3/03547; G02B 6/0068; G02B 6/0021
See application file for complete search history.

(56) References Cited

U.S. PATENT DOCUMENTS

| | | | |
|---|---|---|---|
| 10,228,799 B2 | 3/2019 | Chen et al. | |
| 11,073,948 B2 | 7/2021 | Holmgren et al. | |
| 11,747,547 B2 * | 9/2023 | Chiu | G02B 6/0073 362/97.1 |
| 2012/0014130 A1 * | 1/2012 | Lim | H01H 13/83 362/606 |
| 2017/0311029 A1 * | 10/2017 | Jung | G06F 3/03547 |

FOREIGN PATENT DOCUMENTS

| | | |
|---|---|---|
| CN | 103791319 B | 11/2016 |
| CN | 114077333 A | 2/2022 |
| CN | 114115590 A | 3/2022 |
| TW | M275427 U | 9/2005 |
| TW | 200933220 A | 8/2009 |
| TW | 201117065 A1 | 5/2011 |
| TW | 201310282 A | 3/2013 |
| TW | 1485448 B | 5/2015 |
| TW | 201804223 A | 2/2018 |
| TW | 201823780 A | 7/2018 |
| TW | 202309952 A | 3/2023 |
| TW | M640905 U | 5/2023 |
| WO | WO 2010/119590 A1 | 10/2010 |

* cited by examiner

*Primary Examiner* — Matthew J. Peerce
(74) *Attorney, Agent, or Firm* — Birch, Stewart, Kolasch & Birch, LLP

(57) ABSTRACT

A light-emitting module includes a light-blocking sheet and a light guide sheet that are arranged on a circuit board. The circuit board includes a light-emitting element. The light-blocking sheet has a hollow portion and a light-blocking portion. The light guide sheet is arranged in the hollow portion, and has a light incident portion and a light guide portion, where the light incident portion includes a first side surface, a second side surface, and a third side surface, the first side surface is adjacent to the light-emitting element, the second side surface and the third side surface are separately connected to the first side surface, the angle formed between the second side surface and third side surface, the angle is smaller than a light-emitting angle of the first light-emitting element, and the light-blocking portion is arranged adjacent to the second side surface or the third side surface.

9 Claims, 15 Drawing Sheets

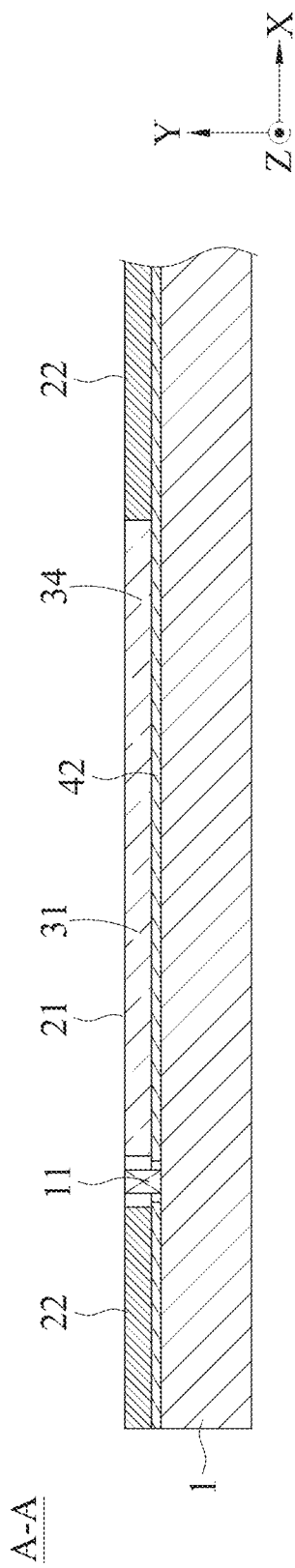
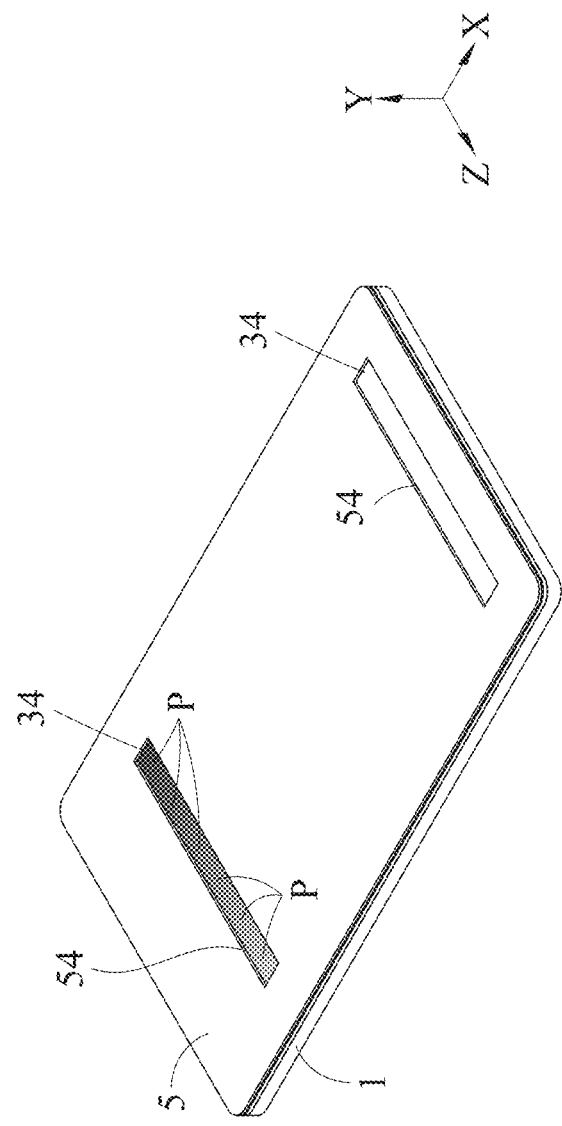
FIG. 5A
FIG. 5B

LIGHT-EMITTING MODULE FOR TOUCHPAD

CROSS-REFERENCE TO RELATED APPLICATION

This non-provisional application claims priority under 35 U.S.C. § 119(a) to patent application No. 112144651 filed in Taiwan, R.O.C. on Nov. 17, 2023, the entire contents of which are hereby incorporated by reference.

BACKGROUND

Technical Field

The present invention relates to a light-emitting module, and in particular, to a light-emitting module for a touchpad.

Related Art

Electronic products, such as notebook computers, usually have physical keys and touch panels. As portable electronic products are developed to be increasingly thin, available spaces of the products are relatively reduced. Therefore, it is likely that a thin and light notebook computer displays virtual keys and visual images on a touch panel to save a space of physical keys and improve operation convenience for a user. The virtual keys and the visual images are displayed on the touch panel through a backlight assembly for the user to operate, and the virtual keys or the visual images emit stray light that affects other surrounding regions.

SUMMARY

In view of this, according to some embodiments of the present invention, a light-emitting module for a touchpad is provided, which is suitable for preventing stray light from occurring around a light-emitting pattern when the light-emitting pattern is lit. In some embodiments, the inventor realizes that, at present, the light-emitting pattern on the touchpad can emit light in different regions and achieve independent control, and light effects do not affect each other. A combination of a spacing portion structure and one or more independent light guide sheets is used. The spacing portion is placed between light guide sheets or patterns, so that a pattern of a light guide sheet is not affected by stray light of another pattern when emitting light. However, as long as light-emitting patterns of the light guide sheets are separated by the spacing portion, the light-emitting patterns cannot show continuity. Without the spacing portion, when a light source is not fully turned on but only partially turned on, there is stray light that affects another position around the light-emitting pattern that should not be luminous.

According to some embodiments of the present invention, a light-emitting module for a touchpad is provided, including a circuit board, a light-blocking sheet, and a light guide sheet. The circuit board has a first light-emitting element. The light-blocking sheet is arranged on the circuit board, and the light-blocking sheet has a hollow portion and a light-blocking portion. The light guide sheet is accommodated in the hollow portion, the light guide sheet has a first light incident portion and a light guide portion, the first light incident portion includes a first side surface, a second side surface, and a third side surface, the first side surface is adjacent to the first light-emitting element, the second side surface and the third side surface are separately connected to the first side surface, an extension of the second side surface and an extension of the third side surface form an angle, the angle is smaller than a light-emitting angle of the first light-emitting element, and the light-blocking portion is arranged adjacent to the second side surface or the third side surface.

According to some embodiments of the present invention, the light-emitting module for the touchpad further includes a light-reflecting layer or a light-absorbing layer arranged between the circuit board and the light-blocking sheet.

According to some embodiments of the present invention, the first light incident portion includes a first region and a second region, the first region is adjacent to the first light-emitting element, the second region is connected to the light guide portion, the first region is in a trapezoidal shape or a divergent geometric shape, and a first length of a border between the second region and the first region is greater than a second length of the first side surface.

According to some embodiments of the present invention, the light-emitting module for the touchpad further includes a light-blocking structure, where the light-blocking structure is arranged on a side surface of the second region.

According to some embodiments of the present invention, the light guide sheet further includes a second light-emitting element and a second light incident portion, the second light incident portion includes a third region and a fourth region, the third region is adjacent to the second light-emitting element, the fourth region is connected to the light guide portion, and the light-blocking portion is arranged between the first region and the third region.

According to some embodiments of the present invention, a light-blocking structure is arranged on a side surface of the second region adjacent to the fourth region.

According to some embodiments of the present invention, the light guide sheet further includes an opening, and the opening is arranged between the second region and the fourth region.

According to some embodiments of the present invention, the light-emitting module for the touchpad further includes a cover plate, where the cover plate is arranged on the light-blocking sheet and the light guide sheet, a light-reflecting region and a light-transmitting region are arranged on a surface of the cover plate facing the light-blocking sheet, the light-transmitting region is arranged corresponding to the light guide portion, and the first light incident portion is arranged corresponding to the light-reflecting region. An area of the light-transmitting region is smaller than an area of the light guide portion.

According to some embodiments of the present invention, the second side surface or the third side surface is a non-flat surface.

Therefore, according to some embodiments, a projection angle of a light ray emitted by the light-emitting element is limited by the first light incident portion of the light guide sheet, so that the light ray is incident onto the light guide portion of the light guide sheet to form an independent light-emitting pattern and there is no stray light around the light-emitting pattern. In addition, according to some embodiments, through light-blocking structures of the light guide sheet, light rays emitted by a plurality of light-emitting elements are turned at an intersection and do not overlap, so that stray light does not overflow at connections between a plurality of light-emitting patterns, which avoids affecting light effects of adjacent light-emitting patterns and forms a seamless connection between the light-emitting patterns to achieve a continuous light-emitting pattern effect without intervals.

The objectives, technical content, and features of the present invention and the efficacy achieved by the present invention are easily understood in the following detailed descriptions by using the specific embodiments with reference to the accompanying drawings.

BRIEF DESCRIPTION OF THE DRAWINGS

FIG. 5A is a schematic cross-sectional view of a lead A-A in FIG. 4;

FIG. 5B is a schematic diagram of an appearance of a light-emitting module having a plurality of light-emitting elements that are emitting light according to some embodiments;

DETAILED DESCRIPTION

The embodiments of the present invention will be described in detail below by way of example and with reference to the accompanying drawings. In the description of this specification, many specific details are provided to provide a thorough understanding of the present invention. However, the present invention may be implemented without some or all of the specific details. The same or similar components in the figures will be denoted by the same or similar symbols. It should be noted that the accompanying drawings are only schematic, and do not represent the actual size or quantity of elements. Some details may not be completely drawn, to keep the accompanying drawings concise.

Figure 1:
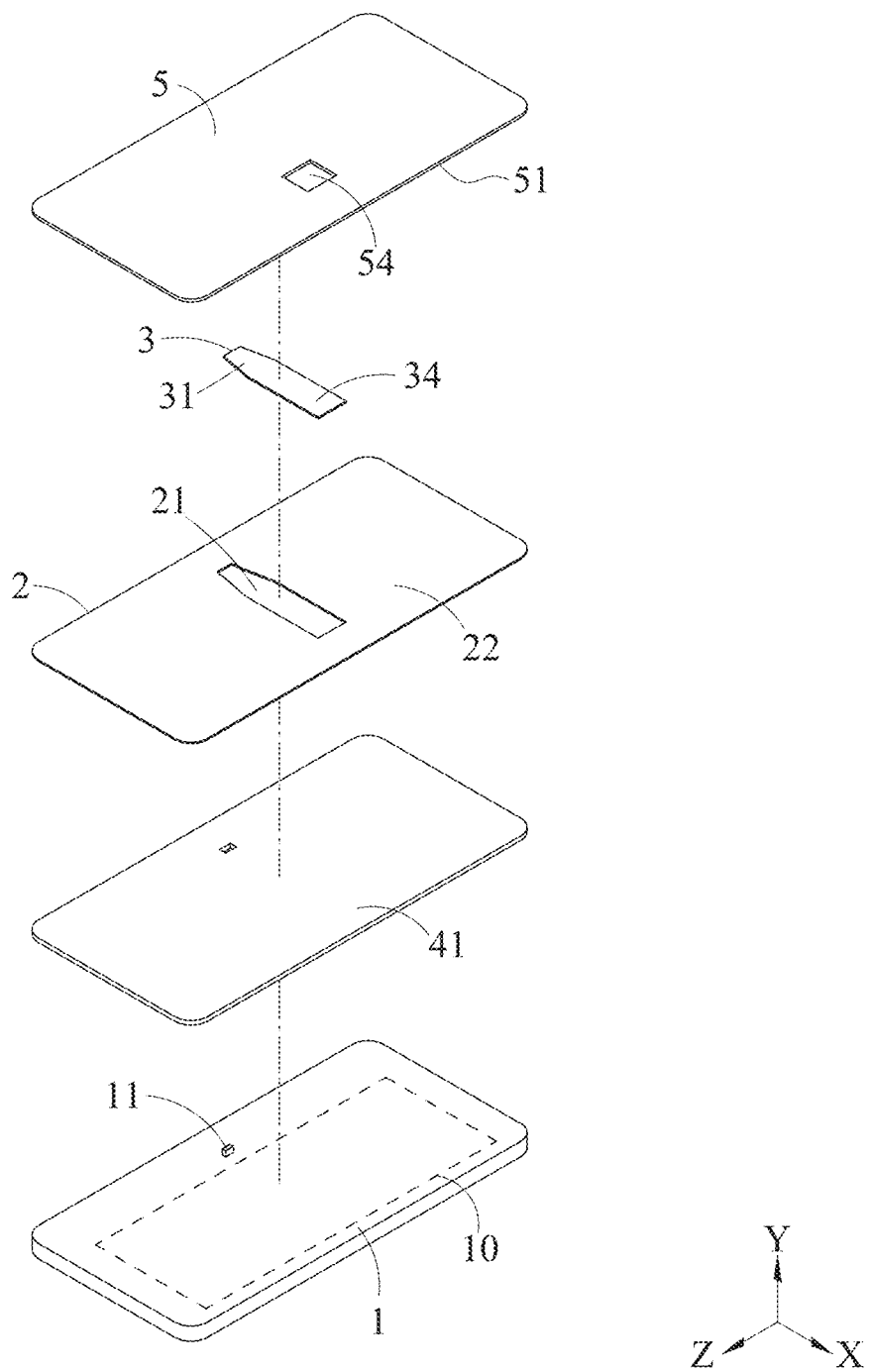
FIG. 1 is a schematic exploded view of a light-emitting module having a single light-emitting element according to some embodiments.

FIG. 1 is a schematic exploded view of a light-emitting module having a single light-emitting element. In some embodiments, an application of the light-emitting module may be a touchpad of a tablet computer, a notebook computer, a game console, or a household appliance. The light-emitting module displays a light-emitting pattern P on the touchpad (a gray block in FIG. 2 indicates a region of the light-emitting pattern P). The light-emitting pattern P is a virtual key or a visual image, and may display, for example, but is not limited to, a computer function menu adjusted and controlled in sections, and display a corresponding status. For example, the light-emitting module may display several fan/volume indicators in regions or not in regions. For example, when one fan/volume symbol is displayed for a user to view/click, it indicates that a current fan/speaker has a low rotational speed/volume, but when fan/volume symbols with six light-emitting patterns P (six continuous light-emitting patterns are displayed on left sides of FIG. 4 and FIG. 5B) are displayed for the user to view/click, it indicates that a current fan/speaker has a high rotational speed/volume, and the rotational speed of the fan/the volume of the speaker may be adjusted and controlled in sections by the user through a touch.

To describe the present disclosure more clearly, in the schematic diagram provided in the present disclosure, a first axis X is an X axis of a three-dimensional coordinate system, a second axis Y is a Y axis of the three-dimensional coordinate system, and a third axis Z is a Z axis of the three-dimensional coordinate system.

Figure 2:
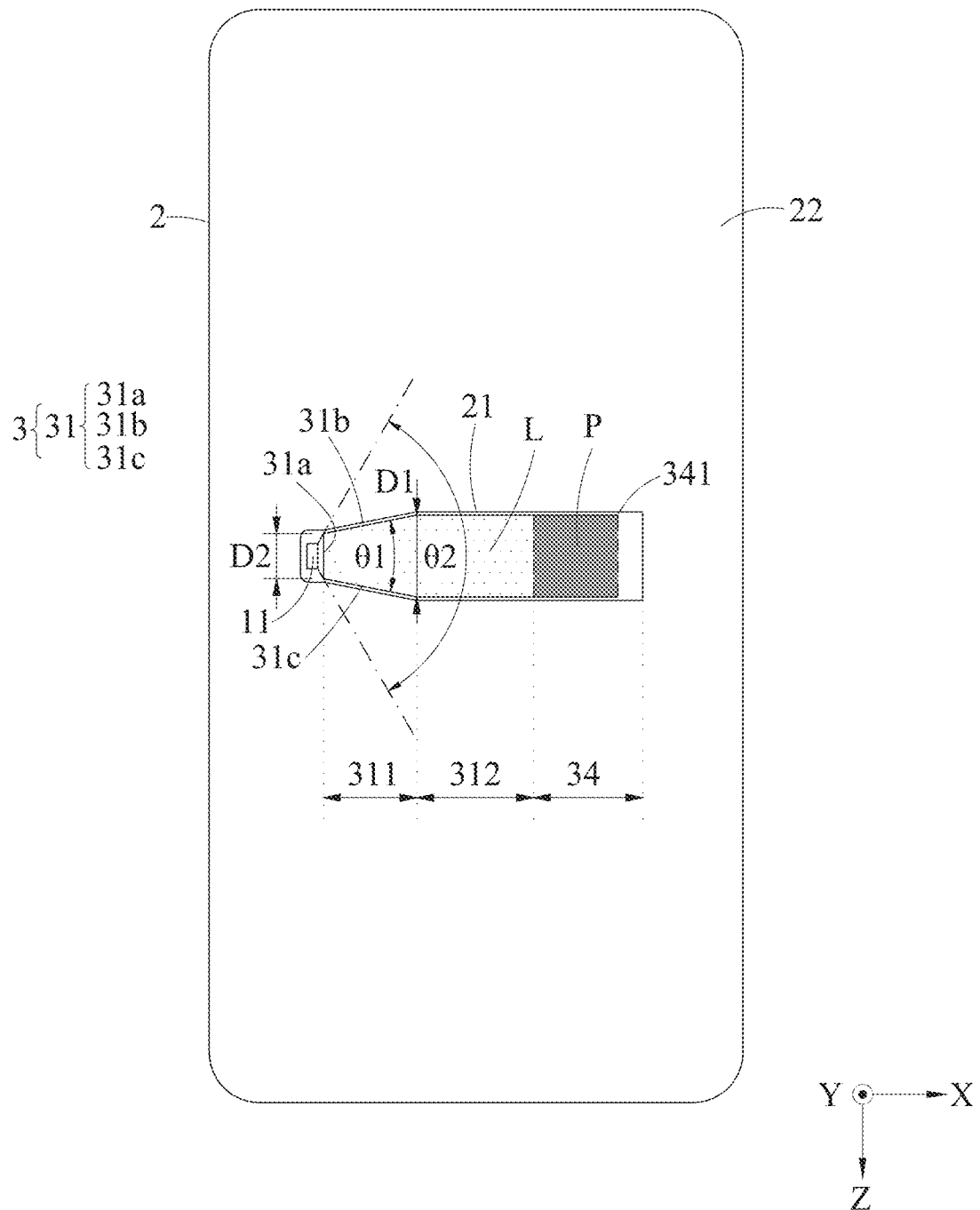
FIG. 2 is a schematic top view of a light-emitting module having a single light-emitting element that is emitting light according to some embodiments.

Referring to FIG. 1 and FIG. 2, FIG. 2 is a schematic top view of a light-emitting module having a single light-emitting element. The light-emitting module for the touchpad includes a circuit board 1, a light-blocking sheet 2, and a light guide sheet 3. The circuit board 1 includes a touch circuit 10, and the circuit board 1 has a first light-emitting element 11. The first light-emitting element 11 may be, but is not limited to, a light-emitting diode element.

Referring to FIG. 1 and FIG. 2, the light-blocking sheet 2 is arranged on the circuit board 1, the light-blocking sheet 2 has a hollow portion 21 and a light-blocking portion 22, the light guide sheet 3 is accommodated in the hollow portion 21, the light-blocking portion 22 of the light-blocking sheet 2 is located at an outer periphery of the light guide sheet 3, and the light-blocking sheet 2 is an annular structure and surrounds the light guide sheet 3. In some embodiments, the light-blocking portion 22 of the light-blocking sheet 2 is higher than the light guide sheet 3 and is adjacent to a cover plate 5 located above. In this case, the light-blocking sheet 2 can prevent a light ray L emitted by the first light-emitting element 11 from leaking (a dotted region in FIG. 2 indicates a region where the light ray L is emitted), thereby avoiding light leakage. In some embodiments, the light-blocking portion 22 of the light-blocking sheet 2 may be made of opaque or light-absorbing plastic, for example, but is not limited to: polycarbonate (Polycarbonate, PC for short).

Referring to FIG. 1 and FIG. 2, the light guide sheet 3 has a first light incident portion 31 and a light guide portion 34, and the first light incident portion 31 and the light guide portion 34 are arranged adjacent to each other. In some embodiments, a dot region 341 is arranged on the light guide portion 34. The dot region 341 corresponds to a surface of the light guide portion 34, and the dot region 341 is configured to change a propagation direction of an incident light ray L, so that the light ray L is projected toward the surface of the light guide portion 34. Therefore, when the light ray L emitted by the first light-emitting element 11 is projected in a direction of the first axis X, the light ray L emitted by the first light-emitting element 11 is refracted by a plurality of dot regions 341, and the reduced light ray L continues to propagate toward a periphery of the light guide portion 34 and reach the periphery of the light guide portion 34 through total reflection, so that other stray light is prevented from occurring around the light guide portion 34 and problems of interference from adjacent light and image persistence around the light guide portion 34 are alleviated.

In some embodiments, the dot region 341 includes a plurality of microstructures, and the plurality of microstructures are composed of a plurality of dots (or light dots), which may be convex dots or concave dots, but not limited thereto, and may be in any shape such as an irregular shape, a cone, a square, a triangle, or a trapezoid. A shape and a size of each of the plurality of dots, a spacing between adjacent convex dots, and/or a spacing between adjacent concave dots may be adjusted according to a shape of light emitted by the first light-emitting element 11, a shape of a light-transmitting region 54 in a top view, a material and surface roughness of the light guide sheet 3, and the like. A better design solution may be obtained through experiments for the foregoing adjustment.

Referring to FIG. 1 and FIG. 2, the first light incident portion 31 of the light guide sheet 3 includes a first side surface 31a, a second side surface 31b, and a third side surface 31c. The first side surface 31a, the second side surface 31b, and the third side surface 31c are all trapezoidal in a top view. The first side surface 31a is adjacent to the first light-emitting element 11, a light-emergent surface of the first light-emitting element 11 faces the first side surface 31a, the first side surface 31a is parallel to the light-emergent surface, a midpoint of the first side surface 31a substantially corresponds to a midpoint of the light-emergent surface, and the second side surface 31b and the third side surface 31c are separately connected to the first side surface 31a. An extension of the second side surface 31b and an extension of the third side surface 31c form an angle $\ominus 1$, and the angle $\ominus 1$ is smaller than a light-emitting angle $\ominus 2$ of the first light-emitting element 11.

Referring to FIG. 1 and FIG. 2, the light-blocking sheet 2 itself has a function of blocking light. When the light-blocking sheet 2 is combined with the light guide sheet 3, the light-blocking sheet 2 surrounds a periphery of the light guide sheet 3, and the light-blocking portion 22 of the light-blocking sheet 2 is arranged adjacent to an outer side of the second side surface 31b or/and the third side surface 31c. Therefore, when the light ray L emitted by the first light-emitting element 11 is projected in the direction of the first axis X, the light-blocking portion 22 on the outer side of the second side surface 31b or the third side surface 31c blocks the light ray L from the first light-emitting element 11, so that the light ray L propagates in a region between the second side surface 31b and the third side surface 31c of the first light incident portion 31.

To describe the present disclosure more clearly, in the schematic diagram provided in the present disclosure, a direction from the first light incident portion 31 to the light guide portion 34 is referred to as the direction of the first axis X (that is, an X-axis direction shown in the figure, or a front-rear direction). The second side surface 31b and the third side surface 31c extend from a position of the first side surface 31a in an inclined and expanded manner in the direction of the first axis X, and a direction perpendicular to the first axis X on a same plane is referred to as a direction of the second axis Y (that is, a Y-axis direction shown in the figure, or an up-down direction). In addition, a direction perpendicular to both the first axis X and the second axis Y is referred to as a direction of the third axis Z (that is, a Z-axis direction shown in the figure, or a left-right direction), and the light-blocking sheet 2 and the light guide sheet 3 are separately arranged with the circuit board 1 in the direction of the second axis Y.

Referring to FIG. 1 and FIG. 2, in some embodiments, the angle $\ominus 1$ between the second side surface 31b and the third side surface 31c of the light guide sheet 3 is set based on a size of the light-emitting pattern P that needs to be presented. A larger angle $\ominus 1$ indicates a larger light-emitting pattern P that can be presented with the first light incident portion 31 and the light guide portion 34 having a large range. The light-emitting pattern P with a plurality of sections is used as an example. When the angle $\ominus 1$ is smaller, it indicates that the light-emitting pattern P with the plurality of sections that can be presented is denser and the fineness of each light-emitting pattern P is higher, and more sections of the light-emitting pattern P can be presented.

In some embodiments, a distance between the first light-emitting element 11 and the light guide portion 34 of the light guide sheet 3 (a distance in the direction of the first axis X) may be adjusted according to factors such as a view angle and a light-emitting intensity of the first light-emitting element 11, the angle $\ominus 1$ between the second side surface 31b and the third side surface 31c, lengths and widths of the second side surface 31b and the third side surface 31c, to present the fineness of the light-emitting pattern P that is required. If a high-fineness light-emitting pattern P is required, a distance between the first light-emitting element 11 and the light guide portion 34 may be adjusted to be shorter, and the second side surface 31b and the third side surface 31c are set to have shorter lengths.

Referring to FIG. 1 and FIG. 2, in some embodiments, the first light incident portion 31 of the light guide sheet 3 includes a first region 311 and a second region 312. The first region 311 and the second region 312 are each defined by the first side surface 31a, the second side surface 31b, and the third side surface 31c, the first region 311 is adjacent to the first light-emitting element 11, and the second region 312 is connected to the light guide portion 34. The first region 311 is in a trapezoidal shape or a divergent geometric shape, a first length D1 of a border between the second region 312 and the first region 311 is greater than a second length D2 of the first side surface 31a, and the second region 312 is in a rectangular shape, but is not limited thereto.

Referring to FIG. 1 and FIG. 2, in some embodiments, the first side surface 31a, the second side surface 31b, and the third side surface 31c of the first light incident portion 31 define a trapezoidal or funnel-shaped contracted structure. The first region 311 and the second region 312 of the first light incident portion 31 are located in the contracted structure, and the contracted structure can limit the projection angle of the light ray L of the first light-emitting element 11. The first region 311 and the second region 312 of the first light incident portion 31 are roughly in a geometric shape of a trapezoid, a funnel (or a divergent shape), or a combination thereof as a whole, and details are described later.

Figure 3:
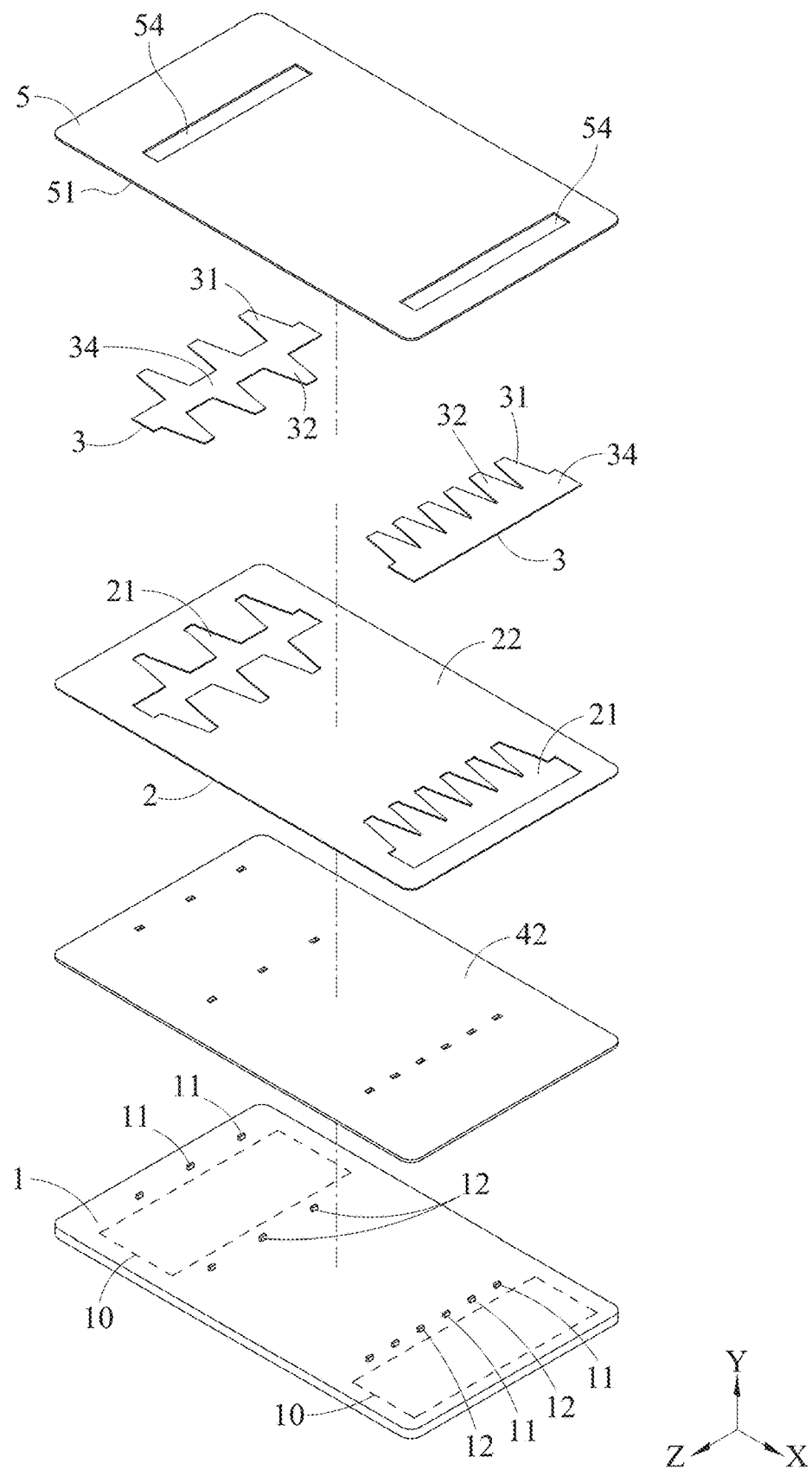
FIG. 3 is a schematic exploded view of a light-emitting module having a plurality of light-emitting elements according to some embodiments.

Referring to FIG. 1 and FIG. 2, in some embodiments, the light-emitting module for the touchpad further includes a light-reflecting layer 41 (as shown in FIG. 1) or a light-absorbing layer 42 (as shown in FIG. 3) arranged between the circuit board 1 and the light-blocking sheet 2. The light-reflecting layer 41 is configured to prevent the light ray L entering the light guide sheet 3 from being emergent from the bottom of the light guide sheet 3. The light-reflecting layer 41 may be presented by printing or coating the circuit board 1, or the light-reflecting layer 41 may be a separate reflecting sheet element. Colors can be printed on a reflecting sheet, and a color scale may be adjusted from white to black to adjust the reflectivity, and the reflecting sheet with the reflectivity adjusted reflects the light ray L and is used for preventing halation. In some embodiments, the light-absorbing layer 42 is made of a material with light-absorbing characteristics. Therefore, the light-absorbing layer 42 absorbs a light ray L from the first light incident portion 31 of the light guide sheet 3 or reduces a light intensity value of the light ray L, to prevent the light ray L from continuing to propagate toward the light guide portion 34 of the light guide sheet 3 and reaching a periphery of the light guide portion 34 through total reflection. In other words, the light-absorbing layer 42 is used as a light attenuation structure of the periphery of the light guide portion 34 to alleviate problems of interference from adjacent light and image persistence.

Referring to FIG. 1 and FIG. 2, in some embodiments, the light-emitting module for the touchpad further includes a cover plate 5. The cover plate 5 is arranged on the light-blocking sheet 2 and the light guide sheet 3, the light-blocking sheet 2 and the light guide sheet 3 are separately arranged with the cover plate 5 in the direction of the second axis Y, the cover plate 5 is located above the light guide sheet 3, and the light-blocking sheet 2 is located between the cover plate 5 and the circuit board 1. A light-reflecting region 51 and a light-transmitting region 54 are arranged on a surface of the cover plate 5 facing the light-blocking sheet 2, the light-transmitting region 54 is arranged corresponding to the light guide portion 34, and the first light incident portion 31 is arranged corresponding to the light-reflecting region 51. In some embodiments, an area of the light-transmitting region 54 is smaller than an area of the light guide portion 34, and the light-transmitting region 54 may be in any shape, for example, an irregular shape, a cone, a square, a triangle, or a trapezoid. In some embodiments, a surface of the cover plate 5 is smoothed or/and hardened, to help a user touch and/or improve wear resistance, and a material of the cover plate 5 may be, but is not limited to, a transparent or semi-transparent material, for example, but not limited to, glass or a film such as a polyester film (Mylar).

Referring to FIG. 1 and FIG. 2, when the first light-emitting element 11 emits the light ray L (a dotted region in FIG. 2 indicates a region where the light ray L is emitted) through the first light incident portion 31 of the light guide sheet 3, a projection angle of the light ray L emitted by the first light-emitting element 11 is limited by the second side surface 31*b* and the third side surface 31*c* of the first light incident portion 31, so that the light ray L is collected in the first light incident portion 31 and is incident onto the light guide portion 34 of the light guide sheet 3 without diverging. The light ray L is reflected through the light-reflecting layer 41 and penetrate the light-transmitting region 54 of the cover plate 5 on the light guide sheet 3, a predetermined light-emitting pattern P is displayed in the light-transmitting region 54, and there is no stray light around the light-emitting pattern P. If there is stray light, a light brightness in a region with the stray light is different from a light brightness in a region with a normal light-emitting pattern P. Therefore, a problem of image persistence around the light-emitting pattern P on the touchpad is alleviated, so that the light-transmitting region 54 on the cover plate 5 displays a predetermined pattern to help a user view/perform a touch operation from the cover plate 5.

Figure 4:
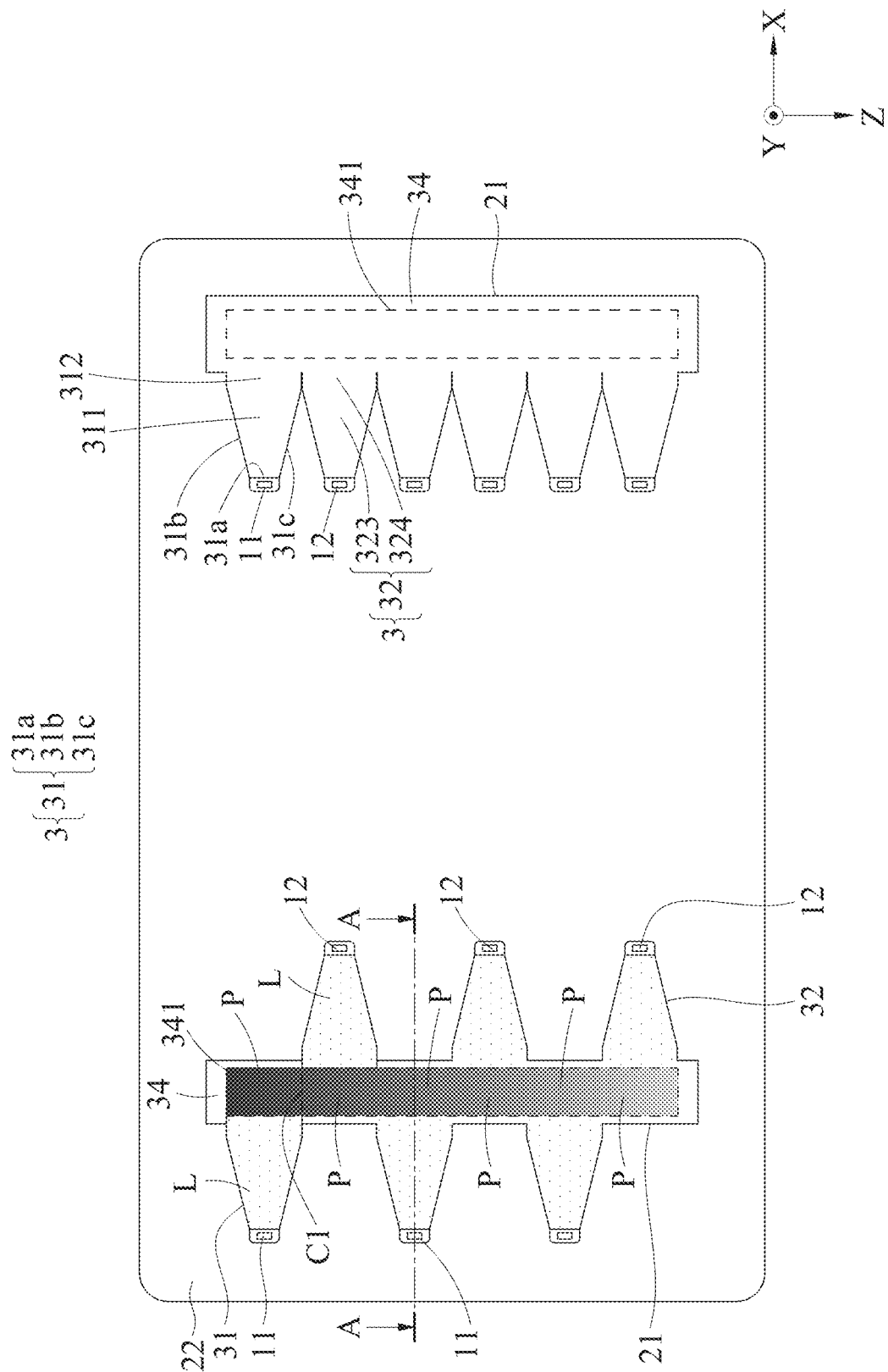
FIG. 4 is a schematic top view of a light-emitting module having a plurality of light-emitting elements that are emitting light according to some embodiments.
Figure 14:
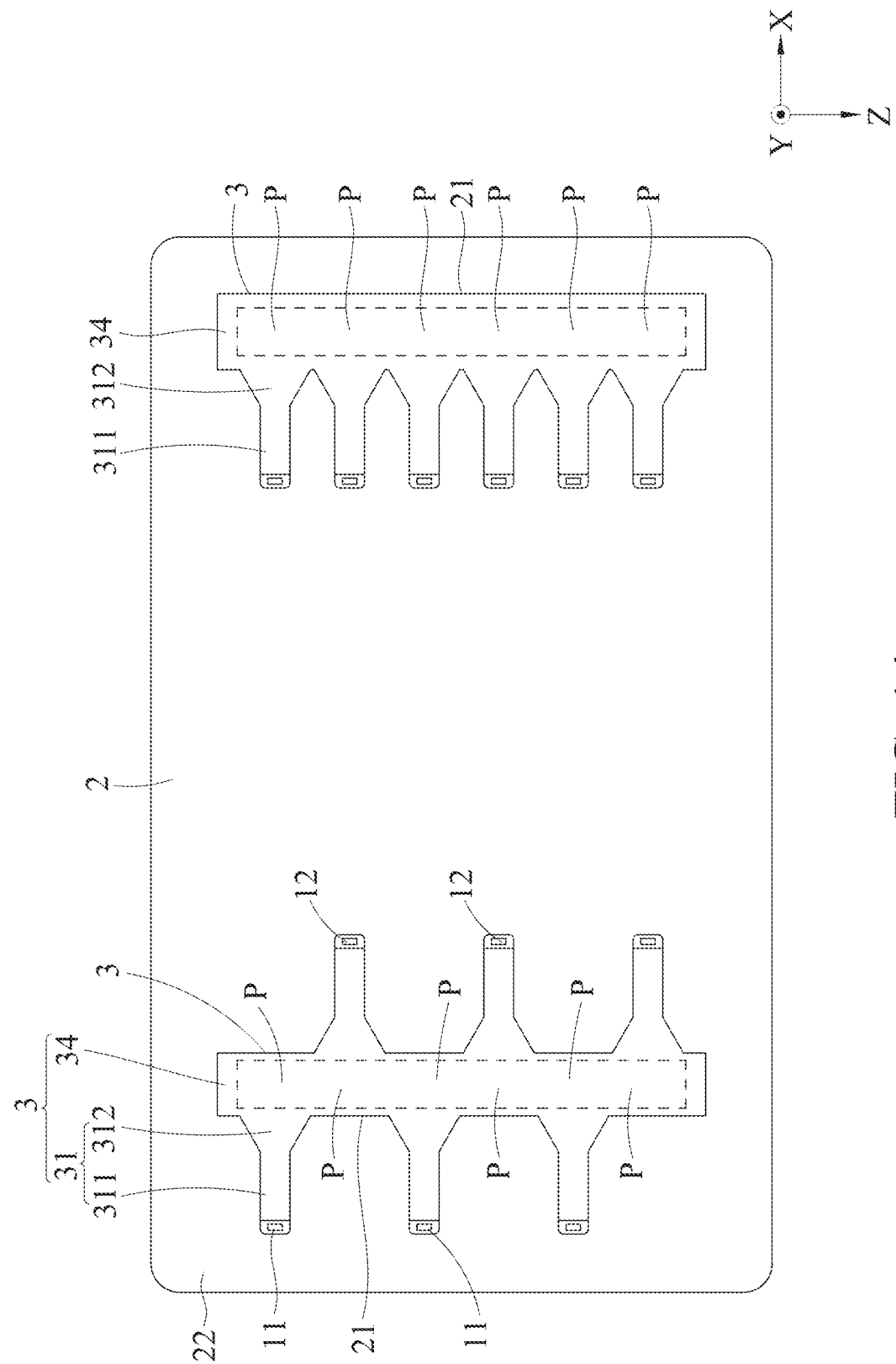
FIG. 14 is a schematic top view of a light-emitting module having a funnel-shaped first light incident portion according to some embodiments.
Figure 15:
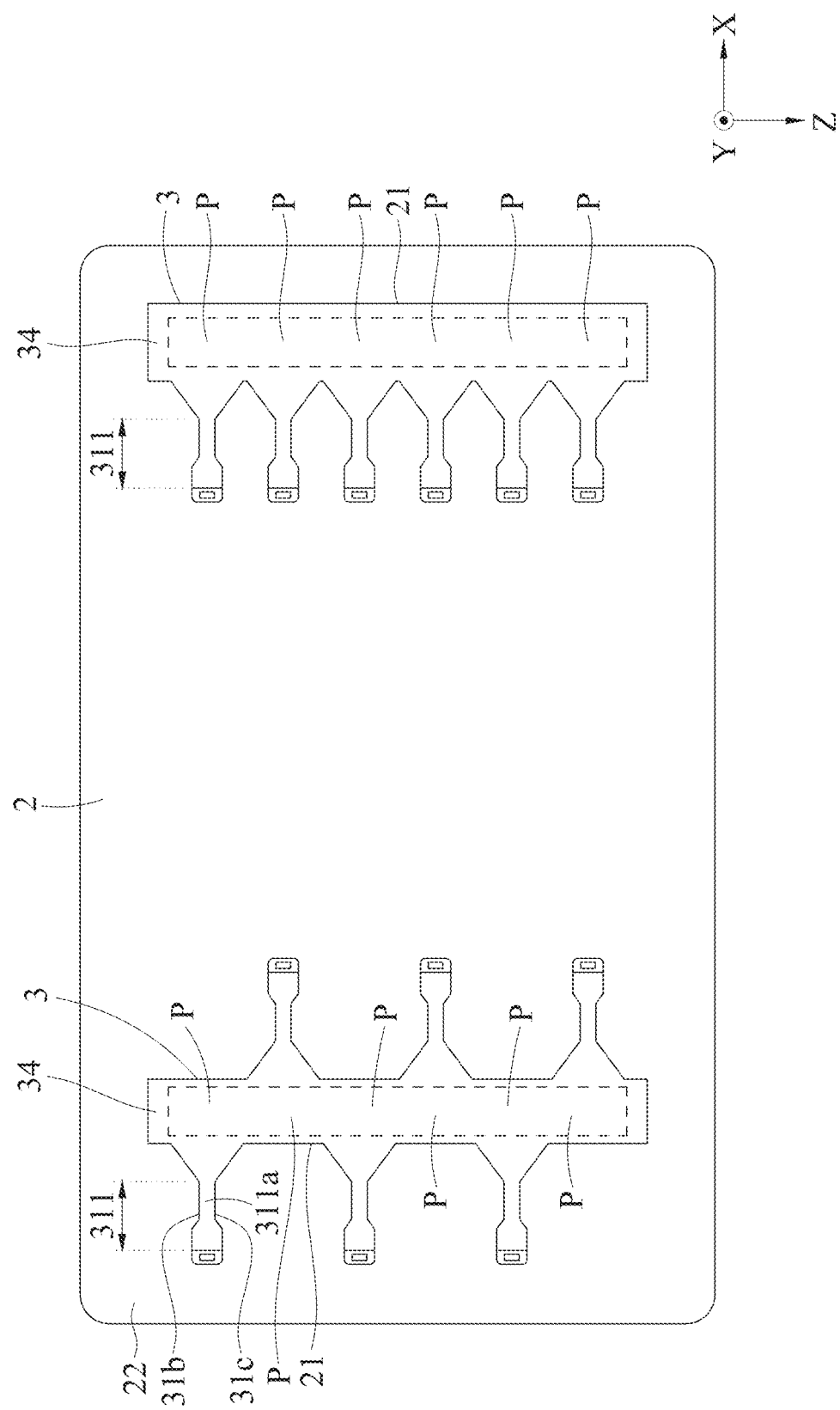
FIG. 15 is a schematic top view of a light-emitting module having a first light incident portion in a narrow channel shape according to some embodiments.

Referring to FIG. 3 to FIG. 5B, FIG. 3 is a schematic exploded view of a light-emitting module having a plurality of light-emitting elements. To clearly present a light-emitting status and a non-light-emitting status of the light-emitting element, a plurality of continuous light-emitting patterns P are shown on a left side of FIG. 4, while no light-emitting pattern P is shown on a right side. FIG. 5A is a schematic cross-sectional view of a lead A-A in FIG. 4. In some embodiments, the light-emitting module for the touchpad may be used to display a plurality of continuous light-emitting patterns P. The light-emitting patterns P may be presented as continuous light-emitting patterns P in a same color gradient region as shown in FIG. 4 and FIG. 5B, or the light-emitting patterns P may be presented in different colors. An example in which the light guide sheet 3 further includes a second light incident portion 32 and a second light-emitting element 12 is used below for description. A configuration manner of the second light incident portion 32 and the second light-emitting element 12 of the light guide sheet 3 is the same as a configuration manner of the first light incident portion 31 and the first light-emitting element 11. In addition, a shape of the second light incident portion 32 may be the same as or different from a shape of the first light incident portion 31. For example, the second light incident portion 32 is in a funnel shape as shown in FIG. 14, or the second light incident portion 32 is in a narrow channel shape as shown in FIG. 15.

Referring to FIG. 3 and FIG. 4, in some embodiments, the second light incident portion 32 includes a third region 323 and a fourth region 324, the third region 323 is adjacent to the second light-emitting element 12, the fourth region 324 is connected to the light guide portion 34, and the light-blocking portion 22 is arranged between the first region 311 and the third region 323.

In some embodiments, on right sides of FIG. 3 and FIG. 4, the first light incident portion 31 and the second light incident portion 32 of the light guide sheet 3 are separately arranged on one side of the light guide portion 34 and are arranged side by side vertically in the direction of the third axis Z. The first light incident portion 31 and the second light incident portion 32 are connected to each other and connected to the light guide portion 34, and the first light-emitting element 11 and the second light-emitting element 12 emit the light rays L from a same direction of the first axis X toward the light guide portion 34.

In some embodiments, on left sides of FIG. 3 and FIG. 4, the first light incident portion 31 and the second light incident portion 32 of the light guide sheet 3 are separately arranged on two sides of the light guide portion 34. In addition, the first light incident portion 31 and the second light incident portion 32 are separately staggered on the two sides of the light guide portion 34. The staggering place is where opposite side ends of the first light incident portion 31 and the second light incident portion 32 are separately arranged at two points on a same center line C1, and the center line C1 is an axis perpendicular to the light guide portion 34 (in the direction of the third axis Z). The first light-emitting element 11 and the second light-emitting element 12 that are in opposite directions emit light rays L in the direction of the first axis X toward the light guide portion 34. Since the first light incident portion 31 and the second light incident portion 32 separately correspond to different positions on the light guide portion 34, light-emitting patterns P formed by the light rays L on the light guide portion 34 are relatively at different positions and do not overlap.

Referring to FIG. 3 and FIG. 4, when the second light-emitting element 12 emits the light ray L through the second light incident portion 32 of the light guide sheet 3, each side surface of the second light incident portion 32 limits a projection angle of the light ray L emitted by the second light-emitting element 12, so that the light ray L is incident onto the light guide portion 34 of the light guide sheet 3, the light ray L penetrates the light-transmitting region 54 of the cover plate 5 on the light guide sheet 3, a predetermined light-emitting pattern P is displayed in the light-transmitting region 54, and there is no stray light around the light-emitting pattern P. If there is stray light, a light brightness in a region with the stray light is different from a light brightness in a region with a normal light-emitting pattern P, thereby alleviating a problem of image persistence around the light-emitting pattern P on the touchpad. When the light ray L of the first light-emitting element 11 present a first section of the light-emitting pattern P, and the light ray L of the second light-emitting element 12 present a second section of the light-emitting pattern P, the first section of the light-emitting pattern P and the second section of the light-emitting pattern P can be seamlessly connected to each other due to being free of obstruction, so that the light-transmitting region 54 on the cover plate 5 displays a predetermined continuous pattern (as shown in FIG. 5B), and presents a light effect of a continuous pattern without intervals, to help a user view/perform a touch operation from the cover plate 5.

An example in which the light guide sheet 3 includes the first light incident portion 31 and the second light incident portion 32 is used above for description, but is not limited thereto. Referring to FIG. 3 and FIG. 4, in some embodiments, the light guide sheet 3 further includes a plurality of light incident portions and a plurality of light-emitting elements. A total of six light incident portions and six light-emitting elements are used to present continuous patterns in more sections. A quantity of the light incident portions and the light-emitting elements may alternatively be another integer. FIG. 4 shows left and right positions of two light guide sheets 3 on the light-blocking sheet 2 to display two columns of continuous patterns in sections, but the present invention is not limited thereto. In some embodiments, a plurality of continuous patterns may be arranged into a geometric shape such as a circle, a square, or a star.

Figure 6:
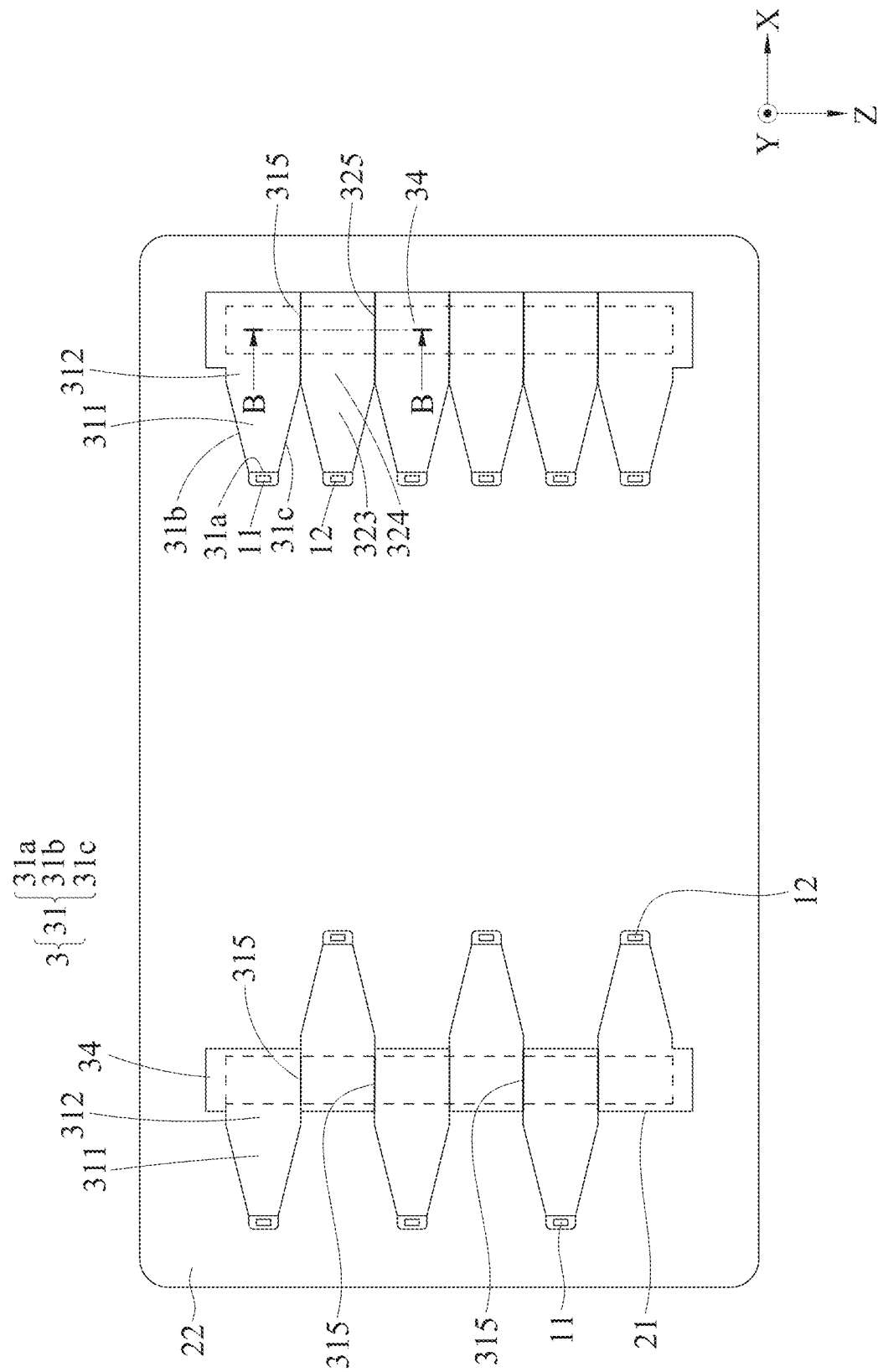
FIG. 6 is a schematic top view of a light-emitting module having a light-blocking structure according to some embodiments.
Figure 7:
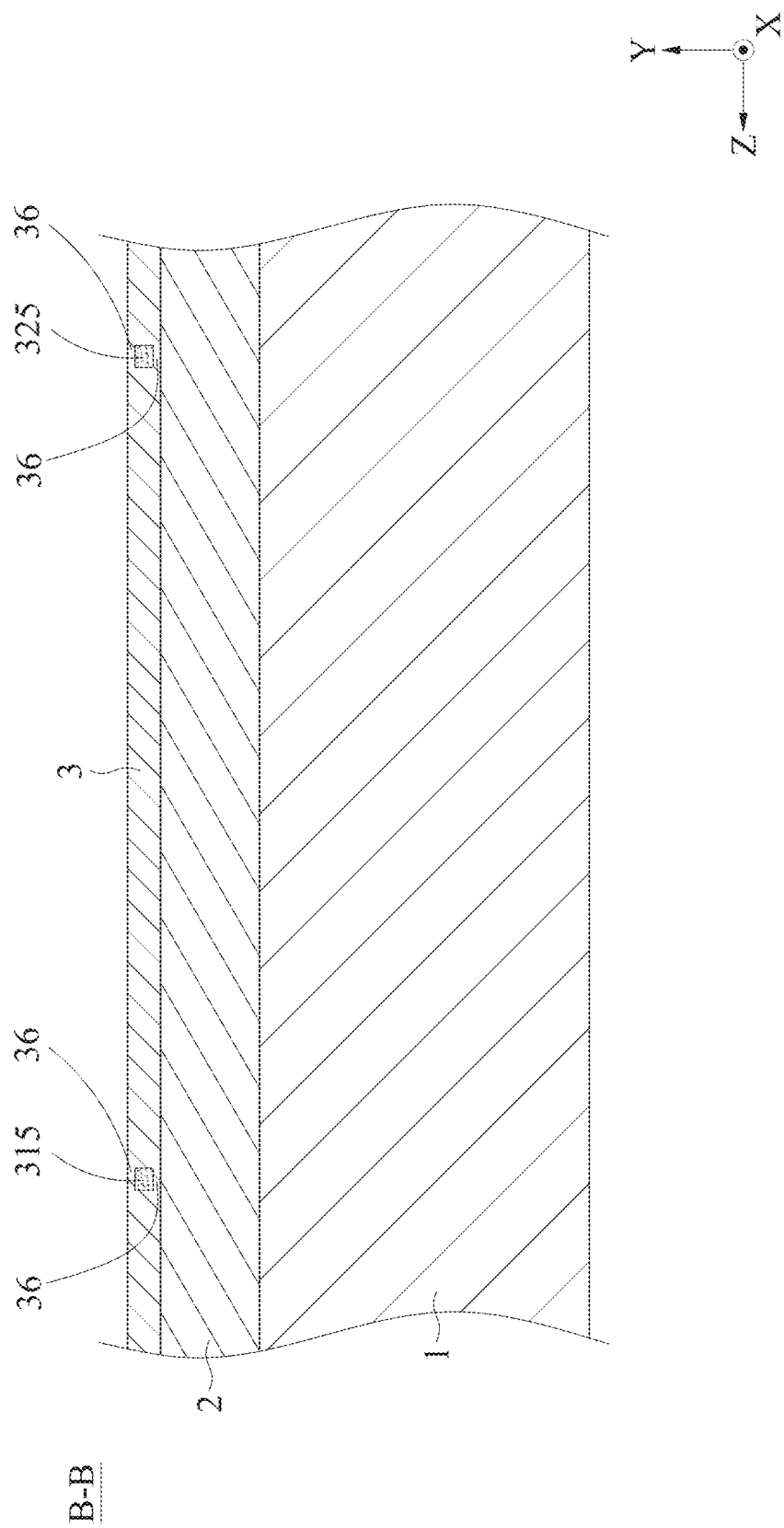
FIG. 7 is a schematic cross-sectional view of a lead B-B in FIG. 6.

Referring to FIG. 3, FIG. 6, and FIG. 7, FIG. 6 is a schematic top view of a light-emitting module having a light-blocking structure, and FIG. 7 is a schematic cross-sectional view of a lead B-B in FIG. 6. In some embodiments, the light-emitting module for the touchpad further includes a light-blocking structure 315, and the light-blocking structure 315 is arranged on a side surface of the second region 312. In a top view of FIG. 6, the light-blocking structure 315 is a strip structure, one end of the strip structure is connected to one side surface of the light guide portion 34, and an other end of the strip structure is connected to an other side surface of the light guide portion 34. In some embodiments, the light-blocking structure 315 is engraved into a black strip structure in a center of the light guide sheet 3 by laser processing. A width of the black strip structure approximately ranges from 0.5 mm to 0.8 mm. An engraved black strip structure with a smaller width indicates that the engraved black strip structure is less likely to be seen from the appearance of the product, and does not affect the light-emitting pattern P displayed on the appearance of the product. In some embodiments, the light-blocking structure 315 and the light guide sheet 3 are formed by double-injection molding.

Referring to FIG. 3, FIG. 6, and FIG. 7, in a cross-sectional view of the light guide sheet 3, the light-blocking structure 315 is located at a center of the light guide sheet 3 in the direction of the second axis Y, and the light guide sheet 3 includes hollow regions 36 above and below the light-blocking structure 315 respectively to prevent the light-blocking structure 315 from affecting flatness of an upper surface and a lower surface of the light guide sheet 3 after laser processing. Therefore, the light ray L emitted by the first light-emitting element 11 is reduced by about 90% (or a range from 60% to 90%) through the blocking of the light-blocking structure 315, a reduced portion of the light ray L propagates toward the periphery of the light guide portion 34, to absorbs residual stray light through the light-blocking structure 315 and alleviate the problem of image persistence, and about 10% of the light ray L continues to propagate toward the periphery of the light guide portion 34. However, the light ray L is not visible to human eyes from the appearance of the product and does not affect aesthetics of the appearance of the product.

In some embodiments, the light-blocking structure 315 is a light-blocking hole, a trench, or a cross-sectional structure and is arranged on the light guide sheet 3. Therefore, the light ray L emitted by the first light-emitting element 11 are blocked by the light-blocking hole, the trench, or the cross-sectional structure, and the reduced light ray L propagates toward the periphery of the light guide portion 34, to absorb the residual stray light and alleviate the problem of image persistence.

Referring to FIG. 3, FIG. 6, and FIG. 7, in some embodiments, the light-emitting module for the touchpad further includes a light-blocking structure 325, where the light-blocking structure 325 is arranged on a side surface of the second region 312 adjacent to the fourth region 324. An arrangement manner and a functional purpose of the light-blocking structure 325 are the same as those of the light-blocking structure 315, and details are not described herein again.

Figure 8:
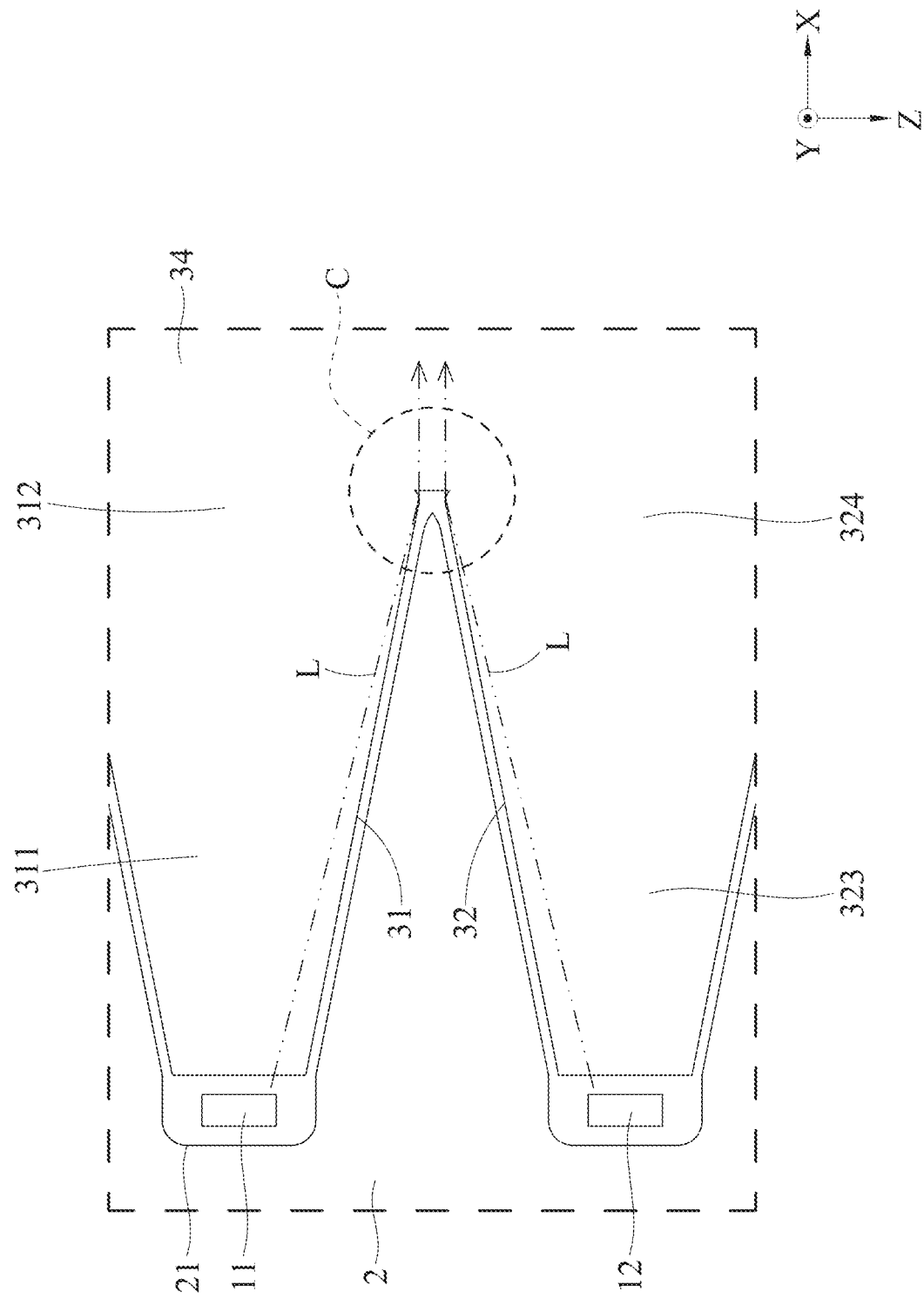
FIG. 8 is a schematic partial diagram of a light-emitting module having an arc portion with a refraction structure according to some embodiments.
Figure 9:
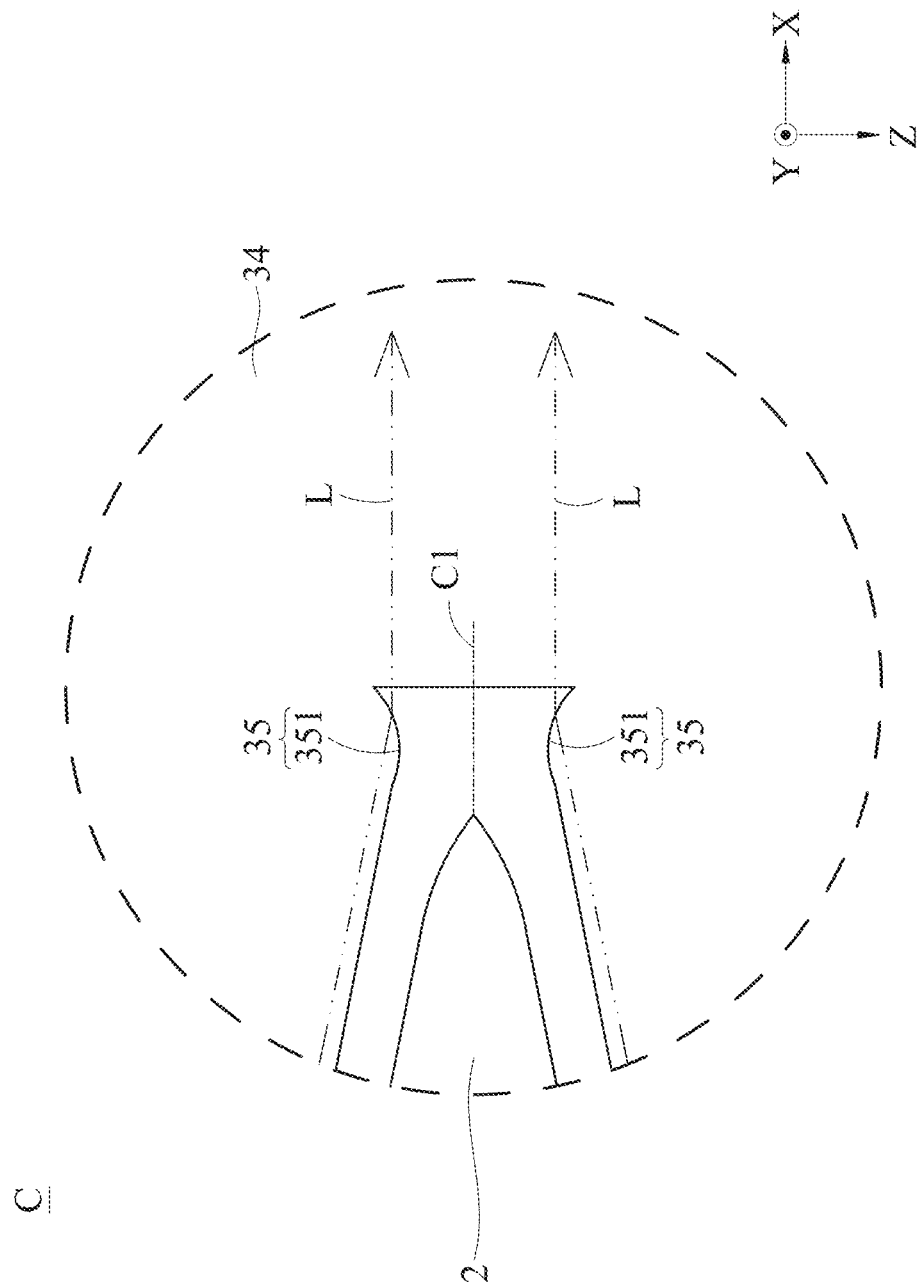
FIG. 9 is a schematic enlarged diagram marked by a circle C in FIG. 8.

Referring to FIG. 3, FIG. 8, and FIG. 9, FIG. 8 is a schematic partial diagram of a light-emitting module having an arc portion with a refraction structure, and FIG. 9 is a schematic enlarged diagram marked by a circle C in FIG. 8. In some embodiments, the light-emitting module for the touchpad includes a refraction structure 35, and the refraction structure 35 may be in a symmetrical shape. An example in which the refraction structure 35 has two arc portions 351 formed on the light guide sheet 3 is used below for description. The two arc portions 351 are separately arranged between the second region 312 and the fourth region 324, and the two arc portions 351 are located on one side of the light guide portion 34 and arranged between the first light incident portion 31 and the second light incident portion 32 that are arranged side by side. The two arc portions 351 are opposite to each other and protrude toward the center line C1 (a one-dot chain line as shown in FIG. 9) between the second region 312 and the fourth region 324, and the two arc portions 351 are arranged in the direction of the third axis Z. When the first light-emitting element 11 or the second light-emitting element 12 emits a light ray L (a two-dot chain line as shown in FIG. 9) through the arc portion 351, the arc portion 351 is used to turn the light ray L, and the light ray L of the first light-emitting element 11 and the light ray L of the second light-emitting element 12 that are adjacent to each other are respectively turned into parallel light rays L at the two arc portions 351 to prevent the stray light from overflowing at an intersection of the light rays L and affecting light effects of adjacent light-emitting patterns P.

Figure 10:
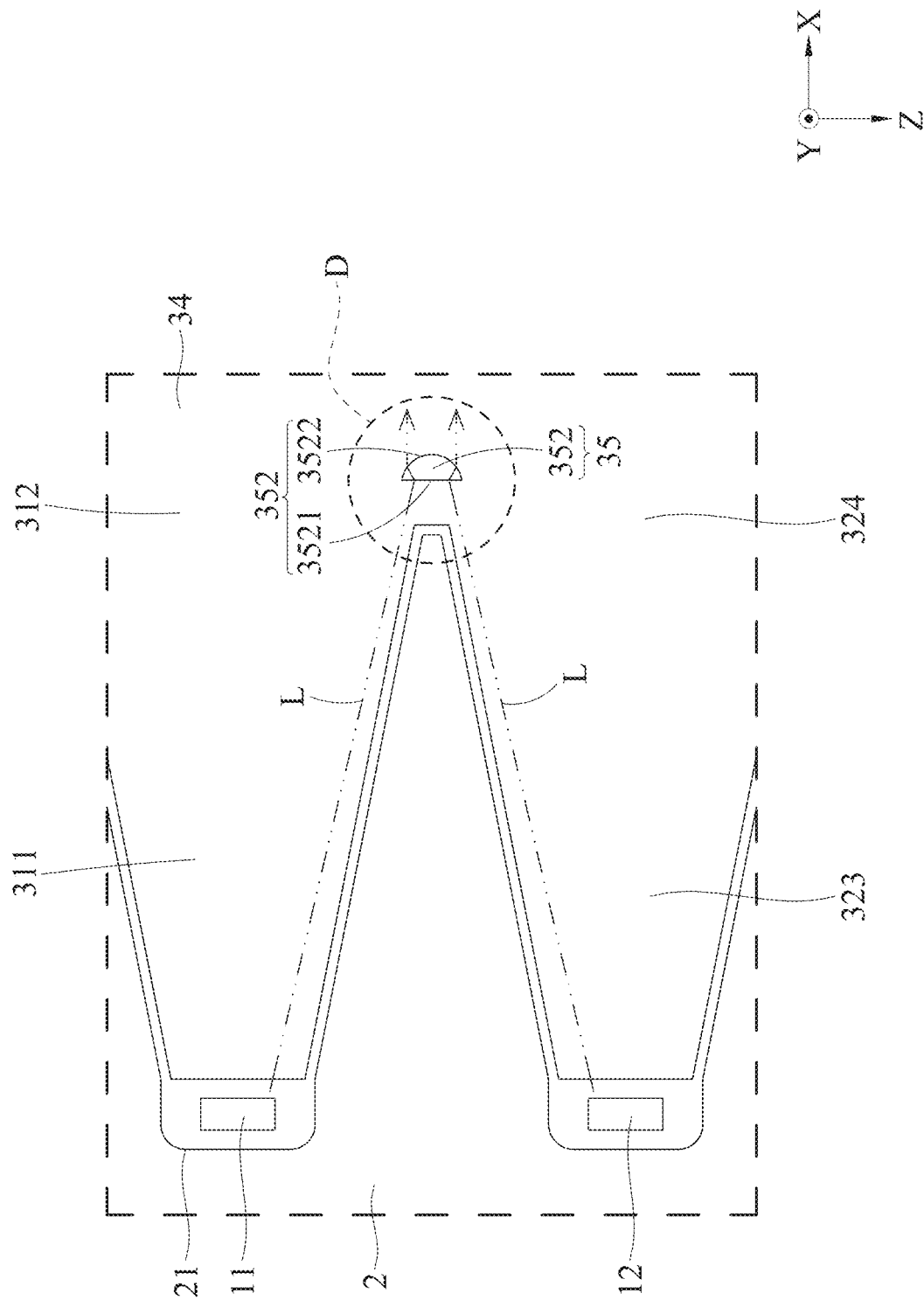
FIG. 10 is a schematic partial diagram of a light-emitting module having an opening with a refraction structure according to some embodiments.
Figure 11:
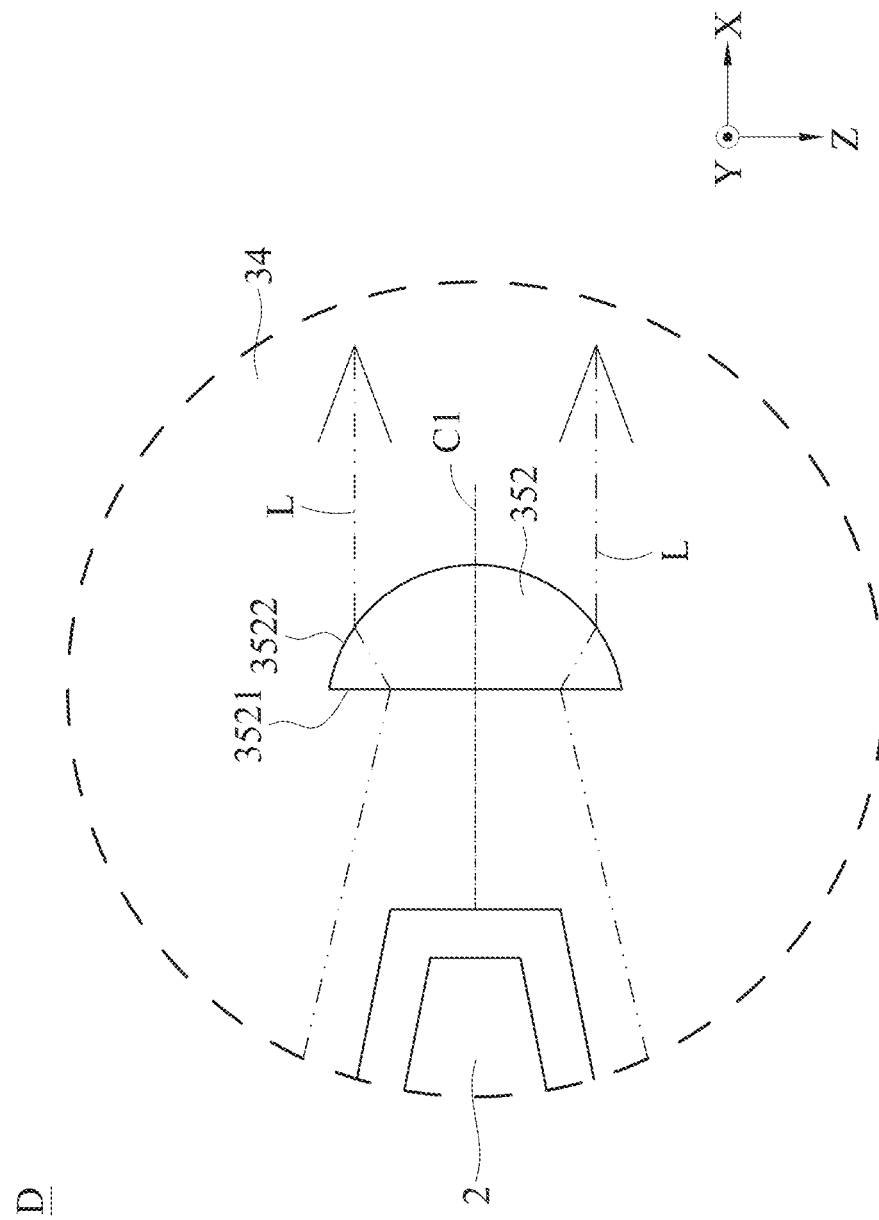
FIG. 11 is a schematic enlarged diagram marked by a circle D in FIG. 10.

Referring to FIG. 3, FIG. 10, and FIG. 11, FIG. 10 is a schematic partial diagram of a light-emitting module, and FIG. 11 is a schematic enlarged diagram marked by a circle D in FIG. 10. In some embodiments, the light-emitting module for the touchpad includes a refraction structure 35, and an example in which the refraction structure 35 has an opening 352 formed on the light guide sheet 3 is used below for description, but the present invention is not limited thereto. The opening 352 on the light guide sheet 3 is arranged between the second region 312 and the fourth region 324 and is located on one side of the light guide portion 34. The opening 352 is located on a center line C1 (a one-dot chain line as shown in FIG. 11) between the first light-emitting element 11 and the second light-emitting element 12, and the center line C1 is approximately located at an intersection of two light rays L. When the first light-emitting element 11 or the second light-emitting element 12 emits a light ray L (a two-dot chain line as shown in FIG. 11) through the opening 352, the opening 352 is used to turn the light ray L, and the light ray L of the first light-emitting element 11 and the light ray L of the second light-emitting element 12 that are adjacent to each other are respectively turned into parallel light rays L to prevent the stray light from overflowing at the intersection of the light rays L and affecting light effects of adjacent light-emitting patterns P.

Referring to FIG. 3, FIG. 10, and FIG. 11, in some embodiments, the opening 352 of the refraction structure 35 has a flat surface 3521 and an arc surface 3522. Two ends of the arc surface 3522 are connected to two ends of the flat surface 3521, and the flat surface 3521 is located on a center line C1 between the first light-emitting element 11 and the second light-emitting element 12 and is perpendicular to the center line C1. The flat surface 3521 is adjacent to and is kept at a predetermined distance from an intersection of the first light incident portion 31 and the second light incident portion 32, and the arc surface 3522 protrudes away from the intersection. When the first light-emitting element 11 or the second light-emitting element 12 emits a light ray L through the flat surface 3521, the flat surface 3521 turns the light ray L to the arc surface 3522, and then the arc surface 3522 turns the light ray L to be emitted in a direction perpendicular to an axis of the light guide portion 34 (the direction of the third axis Z). The light ray L of the first light-emitting element 11 and the light ray L of the second light-emitting element 12 that are adjacent to each other are respectively turned into parallel light rays L on the same flat surface 3521 and the same arc surface 3522 to prevent the stray light from overflowing at an intersection of the light rays L and affecting light effects of adjacent light-emitting patterns P.

Figure 12:
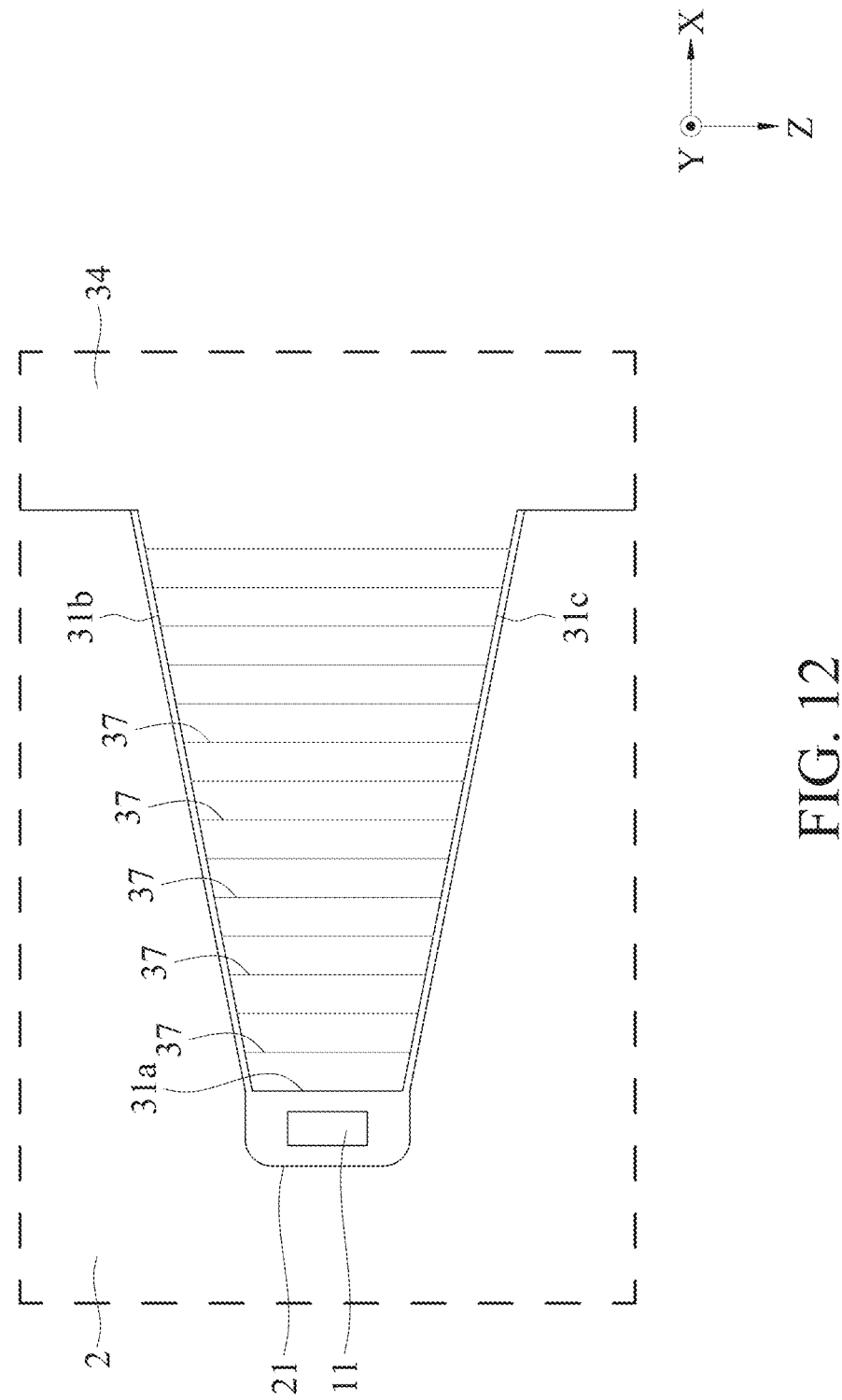
FIG. 12 is a schematic enlarged diagram of a light guide sheet having a plurality of grooves according to some embodiments.

Referring to FIG. 3 and FIG. 12, FIG. 12 is a schematic enlarged diagram of a light guide sheet 3. In some embodiments, the first light incident portion 31 of the light guide sheet 3 includes a plurality of strip-shaped grooves 37 arranged in sequence. The grooves 37 are recessed from the direction of the second axis Y in FIG. 12, the grooves 37 are located on a surface of the light guide sheet 3, the grooves 37 are connected from the second side surface 31b to the third side surface 31c in the direction of the third axis Z, and the grooves 37 are perpendicular to a light-emitting direction of the first light-emitting element 11. The light ray L is converged by using the grooves 37, and the light ray L of the first light-emitting element 11 is converged to the light guide portion 34 directly ahead, which can avoid losing the light ray L and affecting another independent light-emitting region, thereby alleviating a problem of interference from adjacent light. In some embodiments, each groove 37 of the light guide sheet 3 is in a shape of V, U, or inverted "П", and a quantity and arrangement density of the grooves 37 are set as required.

Figure 13:
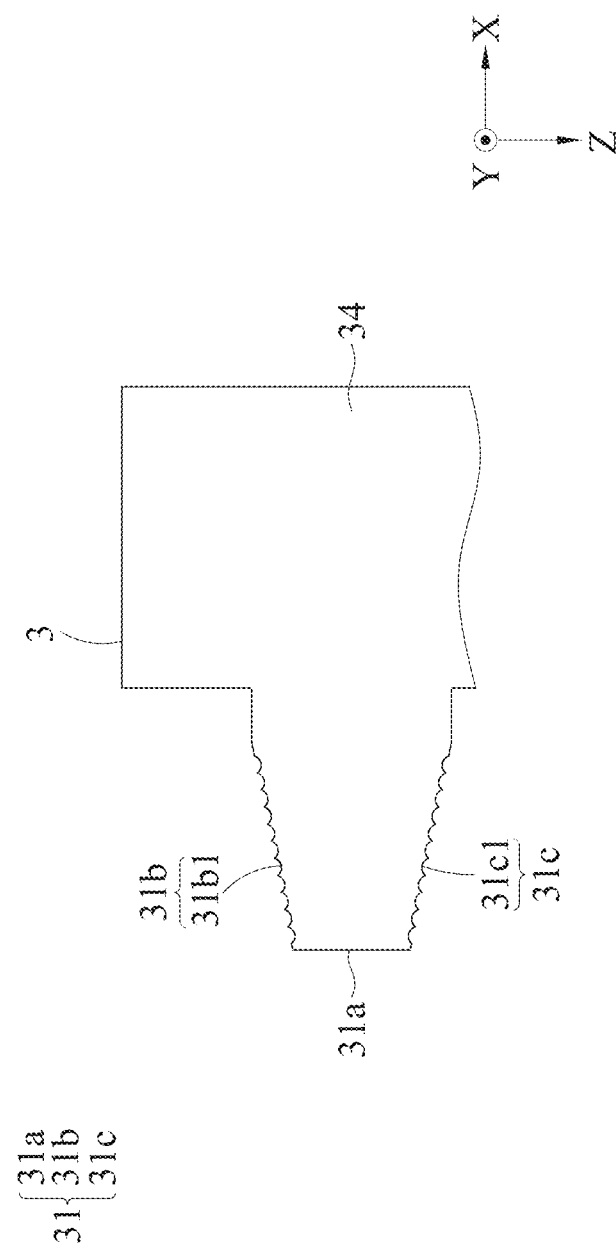
FIG. 13 is a schematic partial diagram of a second side surface and a third side surface of a light guide sheet having a microstructure according to some embodiments.

FIG. 13 is a schematic partial diagram of a light guide sheet 3. In some embodiments, the second side surface 31b or/and the third side surface 31c of the first light incident portion 31 is a non-flat surface. A plurality of microstructures 31b1 are arranged on the second side surface 31b to present a non-flat surface, a plurality of microstructures 31c1 are arranged on the third side surface 31c to present a non-flat surface, and the microstructures 31b1 and the microstructures 31c1 are in a zigzag shape or an arc shape. Therefore, when the light ray L emitted by the first light-emitting element 11 is projected onto the microstructures 31b1 of the second side surface 31b or the microstructures 31c1 of the third side surface 31c, the microstructures 31b1 and the microstructures 31c1 reflect the light ray L to the light guide portion 34 to increase a quantity of light rays L that enter the light guide sheet 3 for total reflection and transmission and increase utilization of the light ray L.

FIG. 14 is a schematic top view of a light-emitting module. In some embodiments, the first region 311 of the first light incident portion 31 is in a rectangular shape, and the second region 312 is in a trapezoidal shape or a divergent geometric shape, but the present invention is not limited thereto. In some embodiments, the first region 311 and the second region 312 of the first light incident portion 31 are in a trapezoidal shape or a divergent geometric shape as a whole. Therefore, when the light ray L of the first light-emitting element 11 is emitted to the first region 311 and the second region 312, a projection angle of the light ray L of the first light-emitting element 11 is limited due to the shape of the first region 311 and the second region 312, to avoid a case that the light ray L propagates around the light-emitting pattern P to cause adjacent light-emitting patterns P to have problems of interference from adjacent light and image persistence.

FIG. 15 is a schematic top view of a light-emitting module. In some embodiments, the first region 311 of the first light incident portion 31 has a narrow region to form a channel 311a with a narrow gap. The channel 311a is the narrow gap between a recessed portion on the second side surface 31b and a recessed portion on the third side surface 31c. The recessed portion on the second side surface 31b and the recessed portion on the third side surface 31c are opposite to each other and form the narrow region. Therefore, when the light ray L of the first light-emitting element 11 is emitted to the first region 311 and the second region 312, a projection angle of the light ray L of the first light-emitting element 11 is limited due to the shape of the first region 311 and the second region 312, to avoid a case that the light ray L propagates around the light-emitting pattern P to cause adjacent light-emitting patterns P to have problems of interference from adjacent light and image persistence.

In summary, according to some embodiments, a projection angle of a light ray emitted by the light-emitting element is limited by the first light incident portion of the light guide sheet, so that the light ray is incident onto the light guide portion of the light guide sheet to form an independent light-emitting pattern and there is no stray light around the light-emitting pattern. In addition, according to some embodiments, through light-blocking structures of the light guide sheet, light rays emitted by a plurality of light-emitting elements are turned at an intersection and do not overlap, so that stray light does not overflow at connections between a plurality of light-emitting patterns, which avoids affecting light effects of adjacent light-emitting patterns and forms a seamless connection between the light-emitting patterns to achieve a continuous light-emitting pattern effect without intervals.

The embodiments described above are merely used for explaining the technical idea and characteristics of the present invention, are intended to enable a person skilled in the art to understand the content of the present invention and to practice the same, and are not intended to limit the protection scope the present invention. Any equivalent change and modification made according to the spirit disclosed in the present invention shall fall within the protection scope of the present invention.

What is claimed is:

1. A light-emitting module for a touchpad, comprising:
   a circuit board, wherein the circuit board has a first light-emitting element;
   a light-blocking sheet, wherein the light-blocking sheet is arranged on the circuit board, the light-blocking sheet has a hollow portion and a light-blocking portion; and
   a light guide sheet, wherein the light guide sheet is accommodated in the hollow portion, the light guide sheet has a first light incident portion and a light guide portion, the first light incident portion comprises a first side surface, a second side surface, and a third side surface, the first side surface is adjacent to the first light-emitting element, the second side surface and the third side surface are separately connected to the first side surface, an extension of the second side surface and an extension of the third side surface form an angle, the angle is smaller than a light-emitting angle of the first light-emitting element, and the light-blocking portion is arranged adjacent to the second side surface or the third side surface; and
   wherein the first light incident portion comprises a first region and a second region, the first region is adjacent to the first light-emitting element, the second region is connected to the light guide portion, the first region is in a trapezoidal shape or a divergent geometric shape, and a first length of a border between the second region and the first region is greater than a second length of the first side surface.

2. The light-emitting module for the touchpad according to claim 1, further comprising a light-reflecting layer or a light-absorbing layer arranged between the circuit board and the light-blocking sheet.

3. The light-emitting module for the touchpad according to claim 1, further comprising a light-blocking structure, wherein the light-blocking structure is arranged on a side surface of the second region.

4. The light-emitting module for the touchpad according to claim 1, wherein the light guide sheet further comprises a second light-emitting element and a second light incident portion, the second light incident portion comprises a third region and a fourth region, the third region is adjacent to the second light-emitting element, the fourth region is connected to the light guide portion, and the light-blocking portion is arranged between the first region and the third region.

5. The light-emitting module for the touchpad according to claim 4, wherein a light-blocking structure is arranged on a side surface of the second region adjacent to the fourth region.

6. The light-emitting module for the touchpad according to claim 4, wherein the light guide sheet further comprises an opening, and the opening is arranged between the second region and the fourth region.

7. The light-emitting module for the touchpad according to claim 1, further comprising a cover plate, wherein the cover plate is arranged on the light-blocking sheet and the light guide sheet, a light-reflecting region and a light-transmitting region are arranged on a surface of the cover plate facing the light-blocking sheet, the light-transmitting region is arranged corresponding to the light guide portion, and the first light incident portion is arranged corresponding to the light-reflecting region.

8. The light-emitting module for the touchpad according to claim 7, wherein an area of the light-transmitting region is smaller than an area of the light guide portion.

9. The light-emitting module for the touchpad according to claim 1, wherein the second side surface or the third side surface is a non-flat surface.

* * * * *